(12) United States Patent
Bunker

(10) Patent No.: US 6,508,340 B1
(45) Date of Patent: Jan. 21, 2003

(54) DISC BRAKE SYSTEM

(75) Inventor: Kenneth James Bunker, Rearsby (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/762,904

(22) PCT Filed: Aug. 2, 1999

(86) PCT No.: PCT/GB99/02533

§ 371 (c)(1), (2), (4) Date: Feb. 14, 2001

(87) PCT Pub. No.: WO00/09909

PCT Pub. Date: Feb. 24, 2000

(30) Foreign Application Priority Data

Aug. 15, 1998 (GB) .............................................. 9817741

(51) Int. Cl.$^7$ ................................................. F16D 65/10
(52) U.S. Cl. ............................. 188/218 XL; 188/71.5; 188/71.6
(58) Field of Search ..................... 188/71.5, 218 XL, 188/4 B, 71.6, 264 A, 264 AA

(56) References Cited

U.S. PATENT DOCUMENTS

| | | | | |
|---|---|---|---|---|
| 3,837,420 A | * | 9/1974 | Kobelt ....................... 188/71.6 |
| 4,640,557 A | | 2/1987 | Panizza et al. |
| 4,863,000 A | * | 9/1989 | Patel ..................... 188/218 XL |
| 4,865,160 A | * | 9/1989 | Casey .................. 188/218 XL |
| 4,886,323 A | | 12/1989 | Giorgetti et al. |
| 4,969,694 A | | 11/1990 | Caron |
| 5,005,676 A | * | 4/1991 | Gassiat ................. 188/218 XL |
| 5,090,236 A | | 2/1992 | Vignotto |
| 5,215,168 A | * | 6/1993 | Guilot et al. ............... 188/71.6 |
| 5,285,872 A | * | 2/1994 | Kaneda ...................... 188/71.5 |
| 5,421,438 A | * | 6/1995 | Flotow et al. .......... 188/264 A |
| 6,056,089 A | * | 5/2000 | Karlsson et al. ........... 188/71.6 |
| 6,119,820 A | | 9/2000 | Steptoe et al. |
| 6,131,932 A | | 10/2000 | Bunker |
| 6,223,863 B1 | * | 5/2001 | Bunker ....................... 188/71.5 |
| 6,244,391 B1 | * | 6/2001 | Bunker ....................... 188/71.5 |
| 6,247,560 B1 | * | 6/2001 | Bunker ....................... 188/71.5 |
| 6,305,510 B1 | * | 10/2001 | Bunker ................. 188/218 XL |

FOREIGN PATENT DOCUMENTS

| | | | |
|---|---|---|---|
| DE | 3740373 | 6/1988 | |
| GB | 949018 | 2/1964 | |
| GB | 1091693 | 11/1967 | |
| GB | 2001716 A | 2/1979 | |
| GB | 2164712 | 3/1986 | |
| GB | 2164712 A | 3/1986 | |
| GB | 2320299 | * 6/1998 | ................. 188/71.5 |
| GB | 2320301 | * 6/1998 | ................. 188/71.5 |
| SE | WO 97/20150 | 6/1997 | |
| WO | 9720150 | 6/1997 | |
| WO | 9826192 | 6/1998 | |

* cited by examiner

Primary Examiner—Christopher P. Schwartz
Assistant Examiner—Devon Kramer
(74) Attorney, Agent, or Firm—Scott A. McBain

(57) ABSTRACT

A disc brake system (10) comprises a disc (12, 14), and a hub (16) which is arranged to rotate about an axis (18) thereof. The hub (16) comprises a mounting portion (16d) which is generally in the shape of a hollow cylinder. The system (10) also comprises grooves (20) and teeth (22) by which the disc (12, 14) is mounted on the external surface of the mounting portion (16d) for rotation with the hub (16) as a unit about the axis (18) and the disc (12, 14) can perform axial sliding movement on the hub. The hub (16) carries vanes (62) arranged so that, during rotation of the hub (16) about the axis (18), the vanes act to force air into the interior of the mounting portion (16d). The mounting portion (16d) has openings (60) therethrough arranged so that air forced into the interior of the mounting portion (16d) passes through the openings and flows over said disc (12, 14).

17 Claims, 4 Drawing Sheets

DISC BRAKE SYSTEM

This invention is concerned with a disc brake system, for example for a wheel of a vehicle.

A conventional disc brake system comprises a disc brake, and a hub which provides a mounting for a wheel. The hub is mounted, eg on a suspension link of a vehicle, for rotation about a central axis of the hub. The disc brake comprises a disc which is fixedly mounted on the hub for rotation therewith. The brake also comprises friction material pads arranged on opposite sides of the disc, and a piston and cylinder assembly operable to urge the pads into engagement with the disc, to brake the hub and hence the wheel. Conventionally, the piston and cylinder assembly is slidably mounted and a caliper bridging an edge of the disc is fixed to a cylinder of the assembly. One friction pad is acted on directly by the piston and cylinder assembly while the other pad is mounted on the caliper on the opposite side of the disc. Operation of the assembly presses one pad against the disc and causes sliding movement of the cylinder of the assembly and of the caliper to bring the other pad into engagement with the disc, thereby applying a braking force to the disc and hence to the hub. Such a disc brake generates considerable quantities of heat which limits the materials which can be used and, eg because of thermal expansion effects, can adversely affect the performance of the brake. In order to remove some of the heat generated, it is known to provide cooling passages through the disc through which air is drawn by centrifugal force (see eg WO 97/21042 and GB 2 001 716 A). However, this solution complicates the manufacture of the disc and is not available when the disc is thin (as is desirable to save weight).

In WO 98/25804, a disc brake system is described in which two discs are mounted on the same hub. The use of two discs reduces the heat generated at each disc but makes it even more desirable for the discs to be thin. As described in WO 98/25804, each disc is mounted on the hub by mounting means which is arranged so that the hub and the discs rotate about the central axis of the hub as a unit but the discs can perform axial sliding movement on the hub. The system also comprises a piston and cylinder assembly having its cylinder fixed relative to a suspension link of a vehicle, the cylinder being integrally formed with the link. The system also comprises a caliper fixed relative to the cylinder, the caliper providing supports for friction material pads of the system, including pads between the two discs. The pad furthest from the assembly is fixed to the caliper but the remaining pads are slidably mounted thereon. When the piston and cylinder assembly is operated, a pad operated upon by the assembly and the pads between the discs slide on the caliper, and the discs slide on the hub until each disc is engaged on both sides by a pad.

In WO 98/25804, the hub has a mounting portion which is generally in the shape of a hollow cylinder, and the mounting means mounts the discs on the external surface of the mounting portion. The mounting means described comprises a plurality of axially-extending grooves formed in the hub and teeth projecting from the discs into the grooves, each tooth being a sliding fit in one of said grooves.

It is an object of the present invention to provide improved cooling for a disc of a disc brake system in which the disc can perform axial sliding movement on a hub.

The invention provides a disc brake system comprising a disc, and a hub which is arranged to rotate about an axis thereof, the hub comprising a mounting portion which is generally in the shape of a hollow cylinder, the system also comprising mounting means by which the disc is mounted on the external surface of said mounting portion for rotation with said hub as a unit about said axis and so that the disc can perform axial sliding movement on said hub, characterised in that said hub carries vanes arranged so that, during rotation of the hub about said axis, the vanes act to force air into the interior of said mounting portion, and in that said mounting portion has openings therethrough arranged so that air forced into the interior of the mounting portion passes through said openings and flows over said disc.

In a disc brake system according to the invention, the disc is cooled by the air in a simple manner which allows thin discs to be used. The present invention is applicable to a disc brake system of the type described in WO 98/25804 but is also applicable to other disc brake systems having a disc which is axially movable on a hub.

In a disc brake system according to the invention, said mounting means may comprise a plurality of axially-extending grooves formed in the hub and teeth projecting from the disc into the grooves, each tooth being a sliding fit in one of said grooves, said openings being formed in portions of the hub which are between the grooves. The grooves may be in groups as disclosed in WO 98/25804. Other forms of mounting means are also possible, for example the roller arrangement disclosed in WO 98/26192.

Where the hub has grooves as afore-mentioned, a system according to the invention may also comprise a plurality of leaf springs mounted on said hub on portions thereof which are between said grooves, the leaf springs acting to apply radial force between the disc and the hub (such leaf springs are disclosed in WO 98/25804 and act to control the movement of the disc on the hub). In this case, said springs may have openings therethrough which correspond to said openings in the hub, thereby allowing passage for the air.

Conveniently, said vanes are mounted on a phonic wheel of an anti-lock braking system mounted on said hub.

In order to accommodate the movement of the disc on the hub, said openings in the hub may be in the form of slits which are elongated in the axial direction.

There now follows a detailed description, to be read with reference to the accompanying drawings, of two disc brake systems which are illustrative of the invention.

Figure 1:
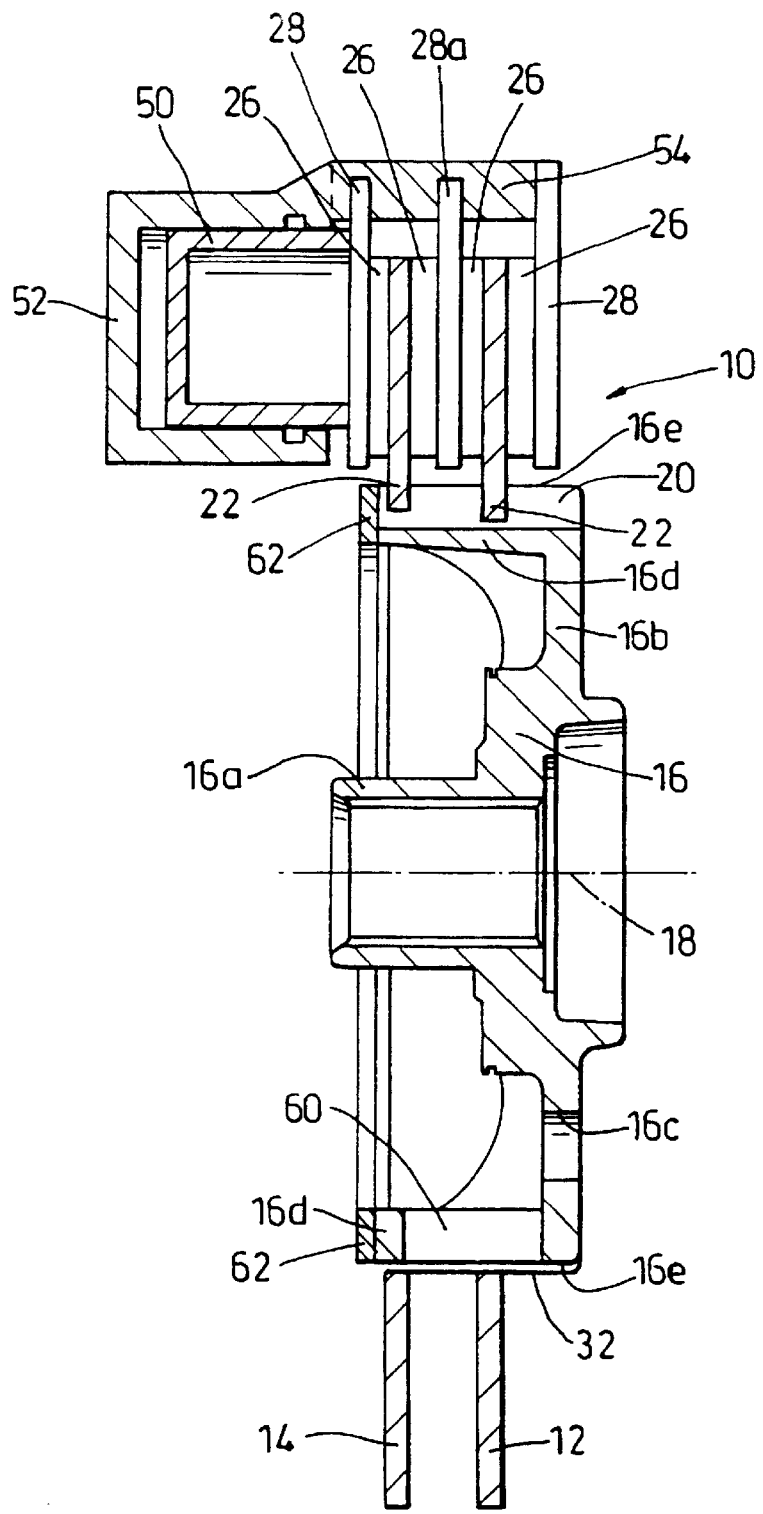
FIG. 1 is a vertical cross-sectional view taken through the first illustrative disc brake system.

The first illustrative disc brake system 10 shown in FIG. 1 comprises a disc 12, a further disc 14 and a hub 16, on which a wheel (not shown) can be mounted. The discs 12 and 14 and the hub 16 are arranged to rotate about a central axis 18 of the hub 16.

The hub 16 comprises an internally splined hollow inner cylindrical portion 16a which is arranged to receive a drive shaft (not shown) which drives the wheel. The hub 16 also comprises an external flange 16b at one end of the portion 16a. This flange 16b has bolt holes 16c through which the wheel (not shown) can be bolted to the flange 16b in a conventional manner. The flange 16b also serves to connect the portion 16a to a mounting portion 16d of the hub 16. The mounting portion 16d is generally in the shape of a hollow cylinder open at one end, closed by the portion 16b at the other end, and having an external surface 16e.

The discs 12 and 14 are identical to one another, being in the form of generally-annular relatively-thin cast iron or steel plates. The two discs 12 and 14 are mounted by means of mounting means of the brake 10 on the cylindrical outer surface 16e of the hub portion 16d so that the two discs 12 and 14 rotate as a unit with the hub 16 about the axis 18 and the discs 12 and 14 can perform axial sliding movement on said hub 16. The mounting means comprises grooves 20 which are formed in the outer cylindrical surface 16e of the portion 16d of the hub 16 and teeth 22 which project inwardly from each of the discs 12 and 14. The teeth 22 enter the grooves 20 and are a sliding fit therein. Between the grooves 20, the outer surface 16e of the hub portion 16d is machined to be accurately cylindrical about the axis 18. The inner surface of each disc 12 and 14, between the teeth 22, is also machined to be accurately cylindrical about the axis 18 and a close fit over the cylindrical portions of the outer surface of the hub portion 16d. The close fit of the discs 12 and 14 on the hub 16 reduces the possibility of the discs 12 and 14 tipping. The brake system 10 also comprises four friction material pads 26 which are arranged with two of the pads 26 on opposite sides of each of the discs 12 and 14. The pads 26 are for braking the discs 12 and 14 by engaging side surfaces of the discs. The friction pads 26 are secured to three backing plates 28, one backing plate 28a being between the discs 12 and 14 and the others being on opposite sides of the discs 12 and 14 to the plate 28a. The median plate 28a has pads 26 secured to both of its faces. When the brakes are applied, a movable outer pad 26 is moved until the four pads 26 and the discs 12 and 14 are all in contact with one another, the discs 12 and 14 and the plate 28a sliding axially to accommodate this movement.

The brake system 10 also comprises resilient means in the form of leaf springs 32 of the type described in WO 98/25804. The leaf springs 32 are mounted on the hub 16 and engaging the discs 12 and 14 so that the springs 32 apply force radially between each of the discs 12 and 14 and the hub 16. The leaf springs 32 are distributed circumferentially around the hub 16, each being mounted on the surface 16e between the grooves 20.

The system 10 also comprises an operating mechanism in the form of a piston and cylinder assembly comprising a piston 50 and a cylinder 52, the cylinder 52 is fixed relative to the axis 18 being integral with a suspension link (not shown) of the vehicle as disclosed in WO 98/25804. The assembly 50, 52 is operable to move a first of the pads 26 into contact with the disc 12 and to cause relative movement between the assembly 50, 52 and the disc 12 to bring the other pad 26 associated with the disc 12 into contact with the disc 12, so that the pads 26 apply a braking force to the disc 12. Specifically, a caliper 54 is mounted on the cylinder 52 and bridges the edges of both discs 12 and 14. The furthest pad 26 from the cylinder 52 has its support plate 28 fixedly mounted on the caliper 54 while the support plates 28 of the remaining pads 26 are slidable on the caliper 54. When the piston 50 is moved outwardly from the cylinder 52 by hydraulic fluid under pressure, it directly presses the support plate 28 of the nearest pad 26 so that the plate 28 slides on the bridge 54. The nearest pad 26 presses the disc 12 so that it slides on the hub 16. The disc 12, in turn, presses on the pad 28 on the opposite side thereof causing the support plate 28a to slide on the caliper 54. The movement of the plate 28a causes the pad 26 on the plate 28a which faces the disc 14 to contact the disc 14. The disc 14 slides on the hub 16 until it contacts the pad 26 on the plate 28 which is fixed to the bridge 54. The brake 10 is now "on" with the discs 12 and 14 both engaged on both sides by one of the pads 26. The pads 26, therefore, apply braking forces to the discs 12 and 14 which forces are transferred to the hub 16.

In order to cool the discs 12 and 14, said hub 16 carries vanes 62 arranged so that, during rotation of the hub 16 about said axis 18, the vanes 62 act to force air into the interior of said mounting portion 16d. Specifically, said vanes 62 project from the annular surface of portion 16d at the opposite end thereof to the flange portion 16b. In this case, the vanes 62 are cast integrally with the hub 16 but they may be attached instead. The vanes 62 are preferably as shown in FIGS. 2 to 4 but may be curved and/or angled as desired.

Said mounting portion 16d of the hub 16 also has openings 60 therethrough arranged so that, during rotation of the hub 16 and the discs 12 and 14, air forced into the interior of the mounting portion 16d passes through said openings and flows over said discs 12 and 14, including between the discs. The openings 60 are formed in portions of the hub portion 16d which are between the aforementioned grooves 20. The openings 60 are in the form of slits which are elongated in the axial direction. Where the openings 60 correspond in position with the springs 32, the springs 32 have openings therethrough which correspond to the openings 60.

Figure 2:
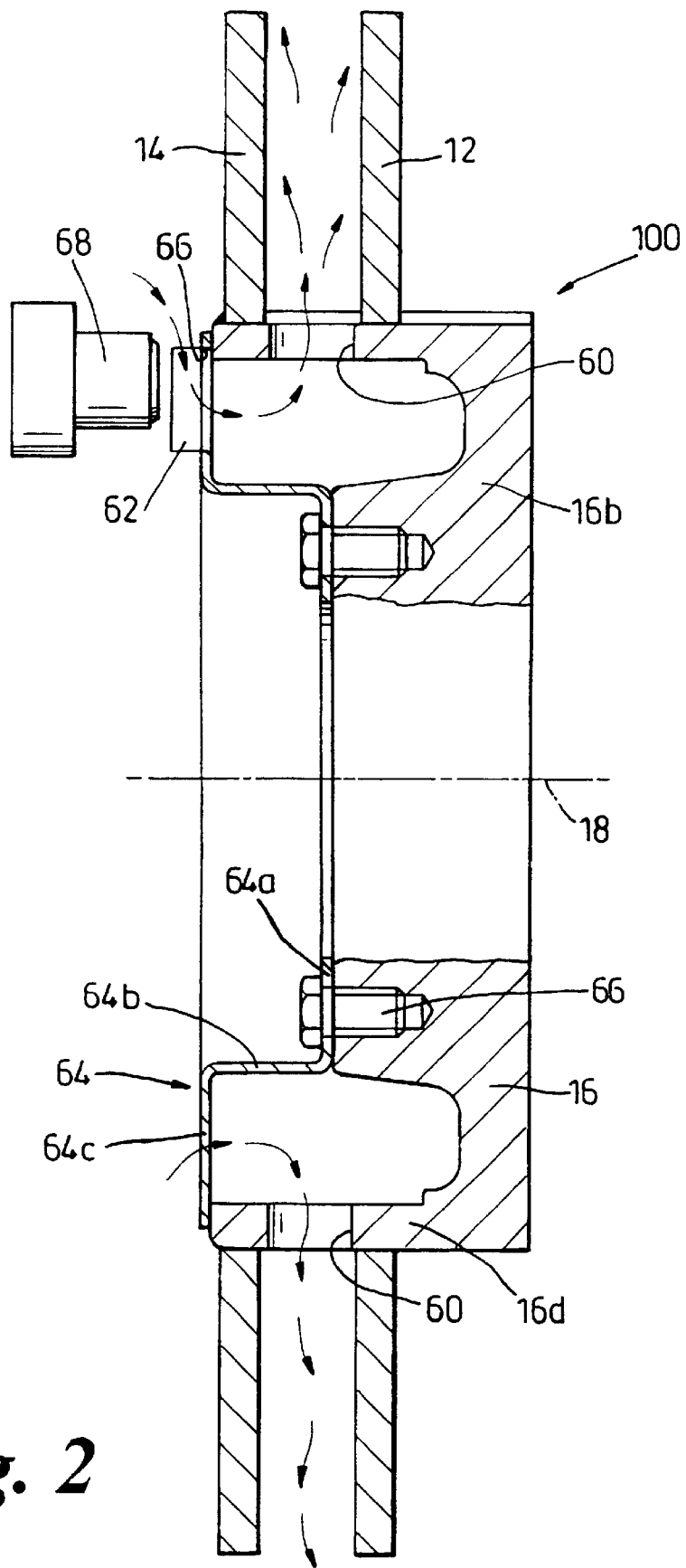
FIG. 2 is a view similar to FIG. 1 but with parts omitted of the second illustrative disc brake system.
Figure 3:
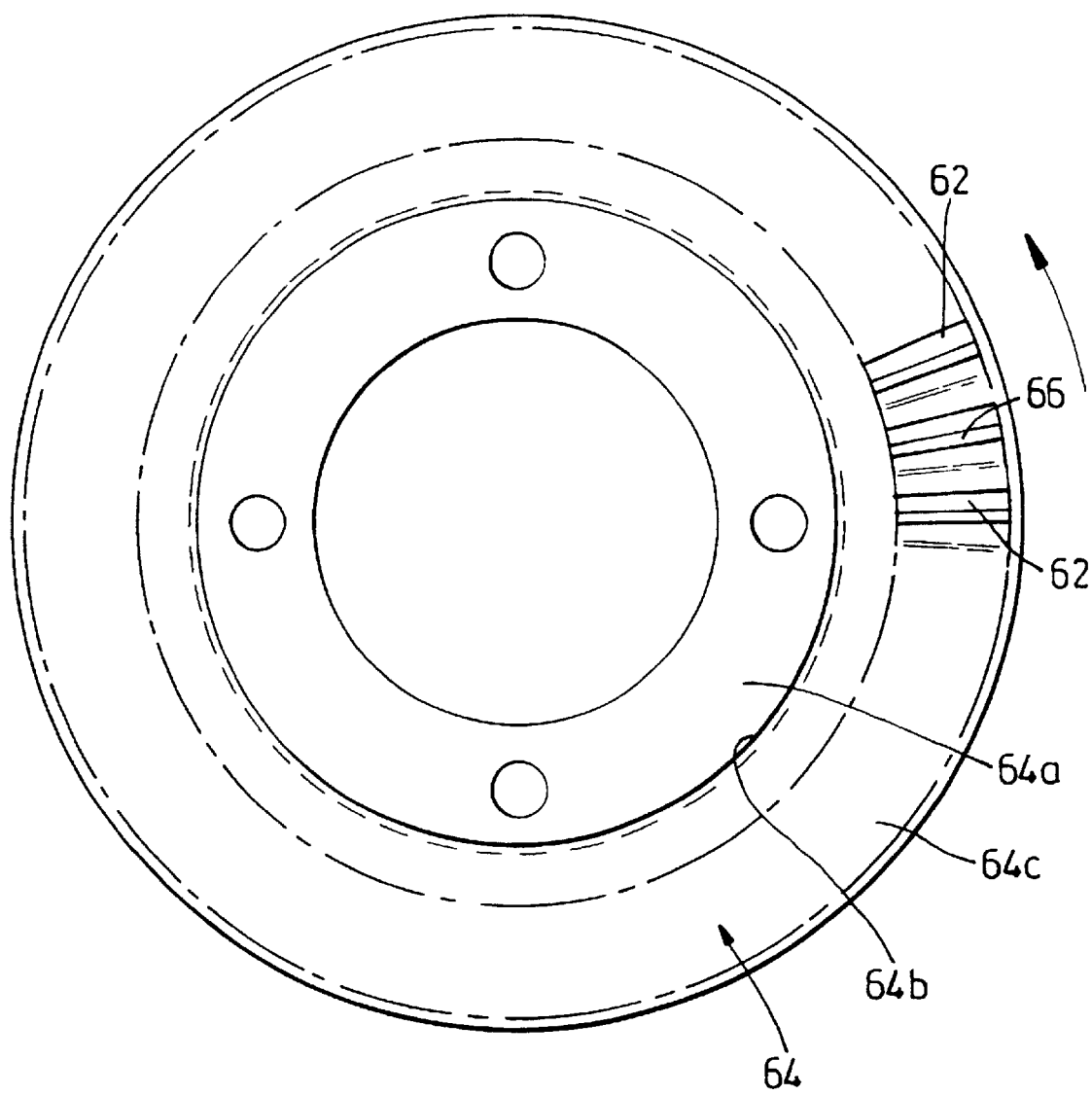
FIG. 3 is an elevational view of a phonic wheel of the second illustrative system.

The second illustrative disc brake system 100 is shown in FIGS. 2 and 3. The system 100 is identical with the system 10 except as hereinafter explained and like parts are given the same reference numerals as in FIGS. 2 and 3 and are not described further herein.

Figure 4:
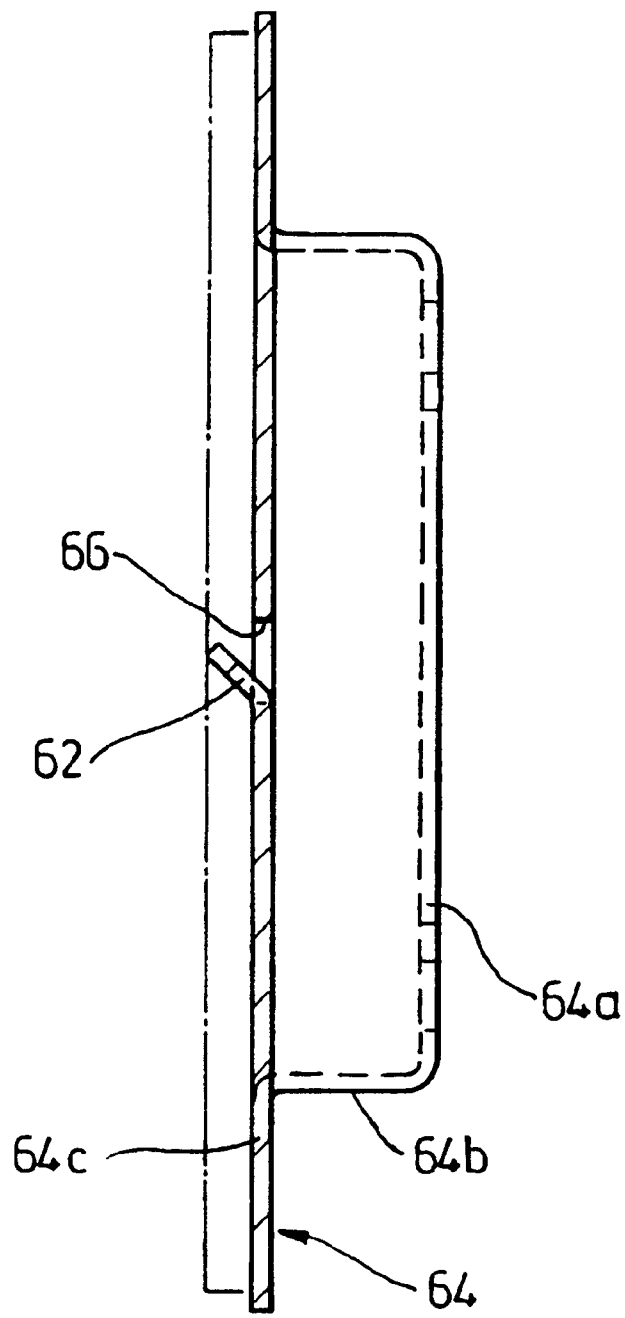
FIG. 4 is a transverse cross-sectional view taken through the phonic wheel shown in FIG. 3.

The system 100 differs from the system 10 in that, the vanes 62 (only one of which is shown in FIGS. 2 and 4, and only three of which are shown in FIG. 3) are mounted on a phonic wheel 64 which is bolted to a rear surface of the flange 16b. Specifically, the phonic wheel 64 (as shown in FIGS. 3 and 4) comprises an inner annular portion 64a which is bolted by bolts 66 to the hub portion 16b, a cylindrical connecting portion 64b extending axially from the outer periphery of the portion 64a, and an outer annular portion 64c which is joined at its inner periphery to the connecting portion 64b. As indicated in FIG. 3 the annular portion 64c has a plurality of radial slots 66 cut into it, the slots 66 being equally spaced about the axis 18. A tag of metal is bent out through approximately 45° from each slot 66 to form the vanes 62. The vanes 62 also serve the function of acting as pulse creators for a magnetic sensor 68 of an anti-lock braking control system (not shown). As indicated in FIG. 2, air can pass through the slots 66 and the openings 60.

What is claimed is:

1. A disc brake system comprising a disc, and a hub which is arranged to rotate about an axis thereof, the hub comprising a mounting portion which is generally in the shape of a hollow cylinder having an external surface and an interior, the system also comprising mounting means by which the disc is mounted on the external surface of said mounting portion for rotation with said hub as a unit about said axis and so that the disc can perform axial sliding movement on said hub, wherein said hub carries vanes spaced from said disc arranged so that, during rotation of the hub about said axis, the vanes act to force air into the interior of said mounting portion, and in that said mounting portion has openings therethrough arranged so that air forced into the interior of the mounting portion passes through said openings and flows over said disc.

2. A disc brake system according to claim 1, wherein said mounting means comprises a plurality of grooves formed in the hub and extending axially and teeth projecting from the disc into the grooves, each of said teeth being in sliding fit relation in an associated one of said grooves, said openings being formed in portions of the hub which are between the grooves.

3. A disc brake system according to claim 2, wherein the system also comprises a plurality of leaf springs mounted on said hub on portions thereof which are between said grooves, the leaf springs acting to apply radial force between the disc and the hub, said springs having openings therethrough which correspond to said openings in the hub.

4. A disc brake system according to claim 1, wherein said vanes are mounted on a phonic wheel mounted on said hub.

5. A disc brake system according to claim 1, wherein the openings in the hub are in the form of slits which are elongated in the axial direction.

6. A disc brake system comprising a disc and a hub which is arranged to rotate about an axis of said hub, said hub including a mounting portion which is generally in the shape of a hollow cylinder having an external surface and an interior, said disc being mounted on said external surface of said mounting portion for rotation with said hub as a unit about said axis and for axial sliding movement on said hub, said hub having vanes spaced from said disc arranged to force air to flow into said interior of said mounting portion during rotation of the hub about said axis, and said mounting portion having openings therethrough arranged to direct the flow of air forced into said interior of said mounting portion through said openings and over said disc.

7. A disc brake system according to claim 6, wherein said mounting portion includes a plurality of grooves formed in said hub and extending axially and said disc includes teeth projecting from said disc into said grooves, each of said teeth being in sliding fit relation in an associated one of said grooves, said openings being formed in portions of said hub which are between the grooves.

8. The disc brake system as in claim 7 further comprising a plurality of leaf springs mounted on said hub between said grooves, said leaf springs acting to apply radial force between said disc and said hub, said leaf springs having openings therethrough which correspond to said openings in said hub.

9. The disc brake system as in claim 6 further comprising a phonic wheel mounted on said hub, said vanes being mounted on said phonic wheel.

10. The disc brake system as in claim 6 wherein said openings in said hub are in the form of slits which are elongated along the direction of said axis.

11. The disc brake system as in claim 6 wherein said hub has an axial end face and said vanes project from said axial end face.

12. The disc brake system as in claim 6 wherein said vanes are integrally cast with said hub.

13. The disc brake system as in claim 6 wherein said hub has an axial end face, and including a phonic wheel attached to said axial end face of said hub, said vanes being mounted on said phonic wheel.

14. The disc brake assembly according to claim 13 wherein said phonic wheel includes an annular portion having a plurality of radial slots, and said vanes each comprising a tag of metal bent out from each of said radial slots.

15. The disc brake assembly according to claim 9 wherein said vanes comprise pulse creators of said phonic wheel for a magnetic sensor of an anti-lock braking control system.

16. A disc brake system comprising a disc, and a hub which is arranged to rotate about an axis thereof, said hub comprising a mounting portion which is generally in the shape of a hollow cylinder having an external surface and an interior, said disc being mounted on the external surface of said mounting portion for rotation with said hub as a unit about said axis and so that said disc can perform axial sliding movement on said hub, wherein said hub carries vanes arranged so that, during rotation of said hub about said axis, said vanes act to force air into said interior of said mounting portion, and in that said mounting portion has openings therethrough arranged so that air forced into said interior of said mounting portion passes through said openings and flows over said disc, said hub including a plurality of grooves extending axially of said hub and teeth projecting from said disc into said grooves, each of said teeth being in sliding fit relation in an associated one of said grooves, said openings being formed in portions of said hub which are between said grooves, and a plurality of leaf springs mounted on said hub on portions thereof which are between said grooves, said leaf springs acting to apply radial force between said disc and said hub, said springs having openings therethrough which correspond to said openings in said hub.

17. A disc brake system comprising a disc, and a hub which is arranged to rotate about an axis thereof, said hub comprising a mounting portion which is generally in the shape of a hollow cylinder having an external surface and an interior, said disc being mounted on the external surface of said mounting portion for rotation with said hub as a unit about said axis and so that said disc can perform axial sliding movement on said hub, wherein said hub carries vanes arranged so that, during rotation of said hub about said axis, said vanes act to force air into said interior of said mounting portion, and in that said mounting portion has openings therethrough arranged so that air forced into said interior of said mounting portion passes through said openings and flows over said disc, and said openings in said hub being in the form of slits which are elongated in the axial direction.

* * * * *